United States Patent Office 3,161,613
Patented Dec. 15, 1964

3,161,613
POLYMERIC REACTION PRODUCT OF AN ORGANOSILANETETROL AND PHENYLBORONIC ACID
Murray M. Sprung, Schenectady, N.Y., assignor to General Electric Company, a corporation of New York
No Drawing. Filed May 12, 1960, Ser. No. 28,510
6 Claims. (Cl. 260—46.5)

This invention is concerned with polymeric organopolysiloxanes containing intercondensed boron atoms attached to silicon by oxygen atoms. More particularly, the invention relates to the polymeric reaction products of (1) an organosilanetetrol having the formula (I) 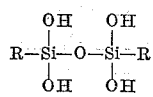

where R is a member selected from the class consisting of cyclohexyl and cyclohexenyl radicals, and (2) phenylboronic acid having the formula (I) 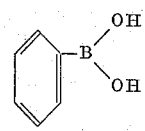

said polymeric reaction product comprising the recurring structural unit having the empirical formula (III)  $[(C_6H_5)_2R_4Si_4B_2O_8]_x$ where $x$ is an integer greater than 1, e.g., from 10 to 1000 or more, and R has the meaning given above.

Polymeric organosilanolboronic acid reaction products have been disclosed in U.S. Patent 2,517,945, Upson, issued August 8, 1950. In this patent are described reaction products of an organosilanediol, for instance, diphenyldisilanediol and a boronic acid, for instance, phenylboronic acid (also known as benzeneboronic acid). The products thus obtained are stated to be soluble in various solvents. It is further pointed out in this patent that when one reacts organosilanetriols of the formula R'Si(OH)$_3$ where R' is an organic radical, with boronic acids, the reaction products may lead to cross-linked polymers as contrasted to non-cross-linkable materials when an organosilanediol of the formula R'$_2$Si(OH)$_2$ is reacted with the phenylboronic acid.

Unexpectedly I have found that contrary to what is disclosed and taught in the aforesaid Upson patent, I am able to obtain soluble, fusible polymers from phenylboronic acid even when the organosilanol used has four hydroxy groups attached to the silicon atoms in the molecule. I have found that by effecting partial condensation of the organosilanetriol (formed initially from the hydrolysis of the organotrihydrolyzable silane), particularly where the organic group is selected from the class consisting of the cyclohexyl and cyclohexenyl radicals, to form the tetrol having the formula

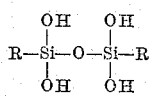

where R has the meaning given above, and this tetrol is thereafter reacted with phenylboronic acid under suitable conditions, I obtain a linear fusible polymer in which the recurring unit is that of Formula III.

One method for effecting reaction between the silanetetrols (hereinafter so designated) having the formula

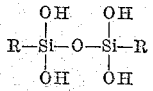

where R is a member of the class consisting of the cyclohexyl and cyclohexenyl radicals, with the phenylboronic acid, comprises reacting the silanetetrol with phenylboronic acid in a molar ratio of from 1 to 5 moles of the latter per mole of the silanetetrol at a temperature ranging from about 60–150° C., preferably in the presence of a suitable solvent, for instance, a hydrocarbon solvent, such as benzene, toluene, xylene, etc., while at the same time removing the water formed by the reaction of the hydroxy groups of the silanetetrol and the benzeneboronic acid. Thereafter, the solution containing the reaction product is filtered and concentrated to remove the solvent and finally heated under vacuum, for instance, at temperatures of from about 100–200° C. until essentially all the solvent is removed. This results in the formation of a resinous composition having the recurring unit mentioned above as Formula III. Molecular weights ranging from 1000 to as high as 100,000 or more can be obtained by this process.

The polymers obtained by the above method are believed to be linearly oriented in which siloxy units

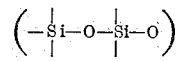

and units of the formula

are both present in the polymer. Although I do not wish to be bound by the following, it is believed that the recurring structural unit may be considered as being the following:

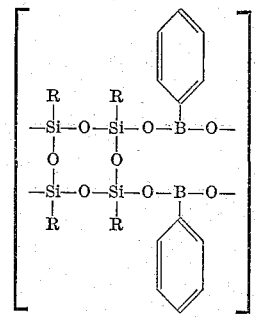

In order that those skilled in the art may better understand how the present invention may be practiced, the following examples are given by way of illustration and not by way of limitation. All parts are by weight.

*Example 1*

This example illustrates the preparation of dicyclohexyltetrahydroxydisiloxane having the formula

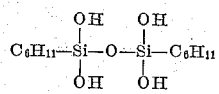

Twenty-six parts of cyclohexyltrichlorosilane was dissolved in 79.2 parts of acetone and hydrolysis of the chlorosilane was effected by pouring this solution into 1200 parts cold water at a temperature of about 20° C. The hydrolysis mixture was allowed to remain at around room temperature (about 27° C.) for about 96 hours. The solid material which had deposited at the end of this time was then filtered and dried. The dried product was dissolved in about 78.9 parts of hot ethanol and to the hot solution thereof was added 175.8 parts of benzene. On cooling to room temperature, about 9.6 parts of 1,3-dicyclohexyltetrahydroxydisiloxane was obtained having a melting point between 205–215° C. Analysis of this compound showed that it contained 47.1 percent carbon and 8.7 percent hydrogen as contrasted to the theoretical values for dicyclohexyltetrahydroxydisiloxane of 47.0 percent carbon and 8.5 percent hydrogen. This compound will hereinafter be referred to as the "cyclohexylsiloxane."

*Example 2*

This example illustrates the preparation of 1,3-dicyclohexenyltetrahydroxydisiloxane having the same formula as that for the cyclohexyldisiloxane with the exception that cyclohexenyl radicals are substituted for cyclohexyl radicals. More particularly, cyclohexenyltrichlorosilane having the formula

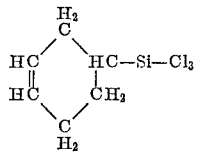

was dissolved in acetone, hydrolyzed in water, and isolated similarly as was described in Example 1 with the exception that cyclohexenyltrichlorosilane was substituted for the cyclohexyltrichlorosilane. The isolated compound 1,3-dicyclohexenyltetrahydroxydisiloxane melted at 166°–170° C. Analysis of the compound showed that it contained 48.3 percent carbon and 7.3 percent hydrogen as contrasted to the theoretical value of 47.66 percent carbon and 7.33 percent hydrogen. This compound will hereinafter be referred to as the "cyclohexenylsiloxane."

*Example 3*

This example illustrates the preparation of a polymeric composition derived from the interaction of the cyclohexylsiloxane with phenylboronic acid. A toluene solution containing about 80 parts toluene, 15.1 parts of the cyclohexylsiloxane and 12.2 parts phenylboronic acid was heated with stirring at the reflux temperature of the resulting solution (about 95–100° C.). Attached to the reflux column was a modified Dean-Stark trap designed to remove any water derived from the condensation of the hydroxy groups attached to the cyclohexylsiloxane and the phenylboronic acid. After about two hours heating, there was obtained about the theoretical amount of water (approximately 3.2 parts) calculated for condensation of all the hydroxy groups of the siloxane and of the phenylboronic acid. The remaining toluene in the solution was then removed by heating the solution under a vacuum and then completing the heating at a temperature of about 120–135° C. for approximately 80 minutes. At the end of this time a pale-colored solid resin was obtained which had a flow point when heated on a hot plate of about 200–220° C. Above this temperature, a clear liquid resulted which again converted to a clear solid resin on cooling. Based on analysis and infrared determination, this product was identified as being composed of recurring units of the formula $(C_6H_5)_2(C_6H_{11})_4Si_4B_2O_8$

*Example 4*

In this example a polymer was prepared by heating together 15.1 parts of the cyclohexenylsiloxane with 12.2 parts of phenylboronic acid in about 78 parts toluene at the reflux temperature of the resulting solution. A Dean-Stark trap was attached to the reflux column so as to remove the water of condensation formed from condensation of the hydroxy groups of the siloxane and of the phenylboronic acid. After heating at reflux for approximately two hours there was obtained about 4 parts of water; further heating did not yield any more water. The toluene solution was then filtered, concentrated by heating at a temperature sufficient to remove excess toluene and finally heated under a vacuum at about 175–185° C. until there was no further loss of weight on continued heating. This yielded a pale amber polymeric product which had a flow point of about 90–100° C. Analysis of this product showed that it contained 11.2 percent silicon and 4.7 percent boron as contrasted to the theoretical values of 11.85 percent silicon and 4.56 percent boron. This analysis, when coupled with infrared determination, established the polymer to be composed of units of the formula $(C_6H_5)_2(C_6H_9)_4Si_4B_2O_8$ The polymers of the instant invention can be used in molding applications to form molded products therefrom having good heat resistance and having high softening points. Solutions can be made of these polymers by dissolving them in hydrocarbon solvents, such as, benzene, toluene, xylene, etc.; methyl ethyl ketone, chlorobenzene, ethylene dichloride, etc., and thereafter coating various surfaces, for instance, electrical conductors or metal or ceramic parts with such solutions, and heating the treated surfaces at temperatures sufficient to volatilize the solvent to leave behind a heat-resistant film. Laminates useful in electrical insulation can also be prepared from these polymers by treating various porous materials such as asbestos cloth, nylon cloth, mica paper, etc., with solutions of the aforesaid polymers, superposing sheets of the treated material upon one another and thereafter pressing the composite sheets at elevated temperatures and pressures to give an integrated, laminated panel having good heat resistance and electrical properties. Alternatively, various fillers can be incorporated in the polymers herein described, among such fillers being, for instance, carbon black, finely divided silicas (e.g., fume silica, precipitated silica, silica aerogel, etc.) and the mixture of ingredients thereafter molded at elevated temperatures of about 150–250° C. to form various objects useful in the insulating and protective arts.

It will be apparent to those skilled in the art that in addition to the conditions employed above, other means of preparation may be used without departing from the scope of the invention. Furthermore, in place of the dicyclohexenyltetrahydroxydisiloxane described above, one can employ other cyclohexenyl-substituted disiloxanes wherein the relationship of the unsaturation of the cyclohexenyl radicals to the point of attachment to the silicon atom is in a position other than shown above. Thus, the relationship of the attachment of the cyclohexenyl radical to the silicon atom (which is not critical) may be such that the double bond can be adjacent to, or one or two carbon atoms removed from the silicon atom.

What I claim as new and desire to secure by Letters Patent of the United States is:

1. The solid, fusible, polymeric product having the empirical formula $[(C_6H_5)_2R_4Si_4B_2O_8]_x$, where $x$ is an integer from 10 to 1000, said product being obtained by effecting reaction at a temperature of from 60–150° C. between (1) a hydrocarbon silanetetrol having the formula

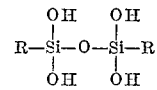

where R is a member selected from the class consisting of the cyclohexyl and cyclohexenyl radicals, and (2) phenylboronic acid.

2. The polymeric solid, fusible product having the empirical formula $[(C_6H_5)_2(C_6H_{11})_4Si_4B_2O_8]_x$, where $x$ is an integer from 10 to 1000, said product being obtained by effecting reaction at a temperature of from 60–150° C. between dicyclohexyltetrahydroxydisiloxane and phenylboronic acid.

3. The polymeric, fusible, solid product having the empirical formula $[(C_6H_5)_2(C_6H_9)_4Si_4B_2O_8]_x$, where $x$ is an integer from 10 to 1000, said product being obtained by effecting reaction at a temperature of from 60–150° C. between dicyclohexenyltetrahydroxydisiloxane and phenylboronic acid.

4. The process for making polymers containing silicon and boron atoms which comprises heating at a temperature of from 60–150° C. a mixture composed of reactants in the molar ratio comprising from 1 to 5 moles phenylboronic acid to 1 mole of a hydrocarbon silanetetrol having the formula

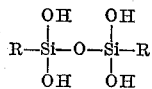

where R is a member selected from the class consisting of cyclohexyl and cyclohexenyl radicals thereby to obtain a solid, fusible, polymeric reaction product having the empirical formula $[(C_6H_5)_2R_4Si_4B_2O_8]_x$, where $x$ is an integer from 10 to 1000 and R has the meaning given above.

5. The process as in claim 4 in which the hydrocarbon silanetetrol is 1,3-dicyclohexyltetrahydroxydisiloxane.

6. The process as in claim 4 in which the hydrocarbon silanetetrol is 1,3-dicyclohexenyltetrahydroxydisiloxane.

References Cited by the Examiner
UNITED STATES PATENTS

| | | | |
|---|---|---|---|
| 2,517,945 | 8/50 | Upson | 260—46.5 |
| 2,915,543 | 12/59 | Groszos | 260—2 |
| 2,957,900 | 10/60 | Groszos | 260—2 |

MURRAY TILLMAN, *Primary Examiner.*

H. N. BURSTEIN, WILLIAM H. SHORT, *Examiners.*